United States Patent [19]

Shahbender et al.

[11] 4,424,469

[45] Jan. 3, 1984

[54] TELEVISION RECEIVER FERRORESONANT HIGH VOLTAGE POWER SUPPLY USING TEMPERATURE STABLE CORE MATERIAL

[75] Inventors: Babah Shahbender; Frank S. Wendt; Irwin Gordon, all of Princeton, N.J.; Robert J. Gries, Indianapolis, Ind.

[73] Assignee: RCA Corporation, New York, N.Y.

[21] Appl. No.: 250,131

[22] Filed: Apr. 2, 1981

[51] Int. Cl.³ ............................................ H01J 29/70
[52] U.S. Cl. ................................. 315/411; 358/190; 323/306
[58] Field of Search ............... 323/306, 307; 336/212, 336/179; 363/75; 358/190; 315/411, 309, 307

[56] References Cited

U.S. PATENT DOCUMENTS

| | | | |
|---|---|---|---|
| 3,034,987 | 5/1962 | Baltzer | 252/62.5 |
| 3,663,913 | 5/1972 | Kato et al. | 336/212 X |
| 4,155,863 | 5/1979 | Simonet . | |
| 4,183,079 | 1/1980 | Wachi | 336/212 X |
| 4,238,342 | 12/1980 | Im et al. | 252/62.61 |
| 4,319,167 | 3/1982 | Wendt | 315/411 |
| 4,390,819 | 6/1983 | Babcock et al. | 315/411 |

FOREIGN PATENT DOCUMENTS

| | | | |
|---|---|---|---|
| 581792 | 8/1933 | Fed. Rep. of Germany . | |
| 2755525 | 6/1978 | Fed. Rep. of Germany . | |
| 2920192 | 11/1979 | Fed. Rep. of Germany . | |
| 3003321 | 7/1980 | Fed. Rep. of Germany | 315/411 |
| 2041668A | 9/1980 | United Kingdom | 315/411 |
| 324657 | 11/1977 | U.S.S.R. . | |
| 463381 | 11/1977 | U.S.S.R. . | |
| 463382 | 11/1977 | U.S.S.R. . | |

OTHER PUBLICATIONS

G. O. White & C. E. Patton, "Magnetic Properties of Lithium Ferrite Microwave Materials", Journal of Magnetism & Magnetic Materials, vol. 9, 1978, pp. 299–317.

"Ferromagnetic Spinels using Lithium" by Robert S. Weisz.

IEEE Transactions on Magnetics, vol. Mag. 14, No. 5, Sep. 1978, pp. 903–905, "Soft Li–Ti–Zn Ferrites with Resistivity > $10^8 \Omega$cm" by William Simonet et al.

Grundlagen der Elektrotechnik by Reth, Kruschwitz, Mullenborn, Vieweg, Braunschweig 1975, section 2.2.3.3.

IEEE Transactions on Magnetics, Sep. 1971, entitled Variable Flux Reset Ferroresonant Voltage Regulator, by Patrick L. Hunter, pp. 564–567.

*Primary Examiner*—Maynard R. Wilbur
*Assistant Examiner*—Robert C. Burk
*Attorney, Agent, or Firm*—E. M. Whitacre; P. J. Rasmussen; Joseph Laks

[57] ABSTRACT

A ferroresonant power supply having a relatively temperature stable output voltage includes a saturating magnetic element having a magnetizable core and a winding located thereon. A magnetizing current is developed in the winding by a high frequency source of alternating input voltage for generating an alternating magnetic flux in the magnetizable core that links the winding so as to develop an alternating polarity output voltage. A capacitor develops a circulating current that generates a magnetic flux in a core section associated with the winding that aids in magnetically saturating the core section to provide regulation of the alternating polarity output voltage by means of ferroresonant action. In order to temperature stabilize the output voltage, the magnetically saturating core section of the magnetic element is formed of a ferrospinel comprising a lithium ferrite or a substituted lithium ferrite. The lithium cation containing ferrospinels have desirable magnetic properties of a relatively small change in saturation flux density with temperature and, when properly manufactured, a low coercivity which results in a relatively small temperature rise above ambient temperature in the saturating element. When the ferroresonant power supply is used to generate an ultor voltage for the picture tube of a television receiver, the regulated alternating polarity output voltage may be stepped up and rectified to provide a regulated DC ultor voltage that is relatively temperature stable.

11 Claims, 4 Drawing Figures

TELEVISION RECEIVER FERRORESONANT HIGH VOLTAGE POWER SUPPLY USING TEMPERATURE STABLE CORE MATERIAL

This invention relates to ferroresonant power supplies using core material having temperature stable properties to provide regulated temperature stable, output voltages.

A power supply having a ferroresonant transformer or a ferroresonant saturable reactor as the regulating element uses the principle of magnetic saturation to maintain a relatively constant output voltage. The regulating element, in combination with a resonant circuit having a resonant frequency selected typically below the frequency of the input voltage, provides for relatively efficient regulation of the output voltage with loading and input voltage variations. The use of passive, reactive components provides for reliability of operation. Because of the ferroresonant principle of operation involved, excessive output voltages are not generated during fault modes of operation.

When operated at a relatively high input frequency, such as the horizontal deflection frequency of about 16 KHz, a ferroresonant transformer is a relatively compact, low weight unit which provides inherent output voltage regulation without the need for relatively complex and expensive electronic regulator control circuitry.

To provide a reasonably good efficiency at a high operating frequency of 16 KHz, the magnetizable core of a ferroresonant transformer may be formed from a relatively high resistivity magnetizable material such as a ferrite. Even when using a ferrite core material, eddy current losses and hysteresis losses in the core and $I^2R$ losses produced by the resonant current in the capacitor coupled winding of the ferroresonant transformer may produce a substantial temperature rise above ambient temperature in the saturating core.

The saturation flux density, Bsat, of many magnetizable materials decreases with increasing temperature. Since the output voltage of a ferroresonant transformer depends in part on the Bsat value of the saturating core material, a rise in saturating core operating temperature may result in an undesirable reduction in output voltage.

Hysteresis and eddy current losses occurring within the saturating core of the ferroresonant transformer or saturable reactor contribute to the heating up of the core and to heating up of the insulated coil wire wound around the core. Relatively large losses are undesirable in that power supply efficiency is reduced and in that a high operating temperature may impose unduly restrictive insulation requirements.

A feature of the invention is the design of a ferroresonant regulating power supply with a saturating core magnetizable material selected to have a relatively temperature stable Bsat and a relatively low coercivity, $H_c$. A material that has only one of the above two desirable properties may be inadequate for use in a ferroresonant power supply.

In an inventive arrangement, a saturating core power supply having a relatively temperature stable output voltage includes a saturating magnetic element having a magnetizable core and a winding located thereon. A magnetizing current, developed by a source of alternating input voltage, generates in the magnetizable core an alternating polarity output voltage. A capacitance develops a circulating current that generates a magnetic flux in a core section associated with the winding that aids in magnetically saturating that core section to regulate the alternating polarity output voltage. In order to provide a regulated output voltage that is stable with temperature changes, a portion of the magnetic circuit that is saturating is formed of a ferrospinel comprising a lithium ferrite or a substituted lithium ferrite.

In another inventive arrangement, the saturating core power supply provides a regulated temperature stable ultor voltage to a television display. A high voltage circuit is coupled to an ultor terminal of the television display and is responsive to the regulated alternating polarity output voltage of the power supply for developing the ultor voltage at the ultor terminal.

Figures 1, 4:
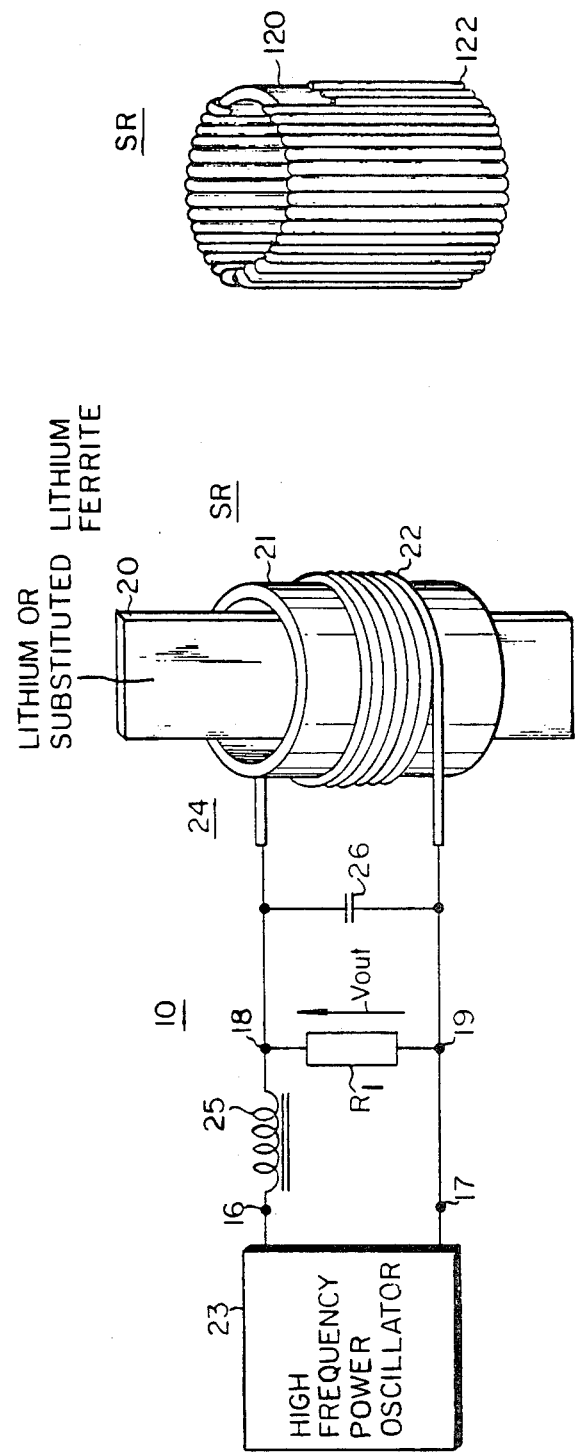
FIG. 1 illustrates a high frequency ferroresonant saturable reactor power supply using a saturating core material having a relatively temperature stable saturation flux density and a relatively low coercivity, such as lithium ferrite or substituted lithium ferrite, embodying the invention.
FIG. 4 illustrates an alternate core and winding configuration for the core and winding configuration of FIG. 1.

In FIG. 1, there is illustrated a high frequency ferroresonant saturable reactor power supply 10 that develops a regulated alternating polarity voltage across terminals 18 and 19 to energize a load circuit illustrated schematically in FIG. 1 as a generalized load $R_1$. Power supply 10 may be illustratively designed to provide a relatively low regulated output voltage Vout of, for example, 24 volts RMS.

Power supply 10 comprises a high frequency power oscillator 23 developing an unregulated alternating input voltage across terminals 16 and 17 and an input choke 25 that couples the alternating input voltage to a high frequency ferroresonant saturable reactor arrangement 24. Ferroresonant saturable reactor arrangement 24 comprises a resonating capacitor 26 coupled across output terminals 18 and 19 and across a reactor winding 22 of a saturating magnetic element or saturable reactor SR. Saturating magnetic element SR comprises winding 22 wound over a hollow plastic bobbin 21 and a magnetizable core 20 located within winding 22 and bobbin 21.

Magnetizing current flows in winding 22 for generating an alternating magnetic flux in magnetizable core 20 that links the winding so as to develop the alternating polarity output voltage Vout. The magnetizing current or saturable reactor winding current is obtained in part from alternating input voltage source 23 and coupled to winding 22 through input choke 25 and in part from the current provided by resonating capacitor 26.

The output voltage Vout is regulated against input voltage amplitude variations and against loading variations by means of the ferroresonant action of the ferroresonant saturable reactor arrangement 24 which causes the inductance of saturating magnetic element SR to switch between a relatively high inductive impedance state and a relatively low inductive impedance state during each half cycle of the output voltage Vout. When saturable reactor SR is in the high impedance state, having, illustratively, an impedance 10 or more times greater than the load impedance $R_l$, a relatively small magnetizing current flows in reactor winding 22. The volt-seconds impressed in core 20 by the output voltage Vout, when the small magnetizing current flows in winding 22, produces a flux reversal in magnetizable core 20 and a subsequent flux buildup in the opposite direction. When saturable reactor SR exhibits a high impedance, the magnetic operating point of magnetizable core 20 is in the linear region of the B-H curve characteristic of the magnetizable core material, below the knee of the B-H curve.

When the volt-seconds impressed across saturable reactor winding 22 locates the magnetic operating point of the core material beyond the knee of the B-H curve into the magnetically saturated region of operation, the inductance of saturable reactor SR switches to a relatively low value. A circulating or resonating current then flows between resonating capacitor 26 and reactor winding 22, producing a pulse of current in the winding and causing the output voltage Vout to reverse polarity.

To produce relatively good output voltage regulation, it may be desirable to design the saturable reactor so that the reactor inductance is as small as practical during magnetic saturation of core 20. The magnitude of the saturated inductance of winding 22 or the inductance during the inverter when core 20 is magnetically saturated, may be chosen as, illustratively, 1/10 the magnitude of the impedance of load circuit $R_l$.

Alternating input voltage source 23 may comprise a high frequency sine-wave or square-wave power oscillator operated at a relatively high input frequency, of illustratively 16 KHz to 20 KHz. When operated at a relatively high input frequency, ferroresonant power supply 10 is a relatively compact, low weight unit which provides inherent output voltage regulation without the necessity of using relatively complex and expensive electronic regulator control circuitry.

Operation at high frequency permits the use of small-valued inductors for input choke 25 and small-valued capacitors for resonant capacitor 26. If power supply 10 is designed to provide a regulated DC voltage, then load circuit $R_l$ includes a rectifier arrangement coupled to a filter capacitor across which the DC voltage is developed. Operation of power supply 10 at a high frequency then permits the use of a relatively low-valued capacitor to filter the rectified output voltage of the ferroresonant saturable reactor arrangement 24.

Operation of power supply 10 at a high frequency permits saturable reactor SR to be designed as a small compact unit as illustrated in FIG. 1, with the core 20 comprising a single slab of magnetizable material. Other configurations for saturable reactor SR may also be used. As illustrated in FIG. 4, saturable reactor SR may comprise a toroidal core 120 with a reactor winding 122 wound around the core and having the winding end leads, not illustrated in FIG. 4, coupled across capacitor 26 of FIG. 1.

When ferroresonant power supply 10 is operated at the relatively high input frequencies of 16 KHz to 20 KHz, eddy current losses in magnetizable core 20 of FIG. 1 or in core 120 of FIG. 4 may become excessive unless taken into account when designing saturable reactor SR. A magnetizable ferrite may be selected as the magnetizable material for the saturable reactor core. Magnetizable ferrites may be prepared or fabricated to exhibit relatively high resistance to eddy current generation, with resistivities greater than $10^2$ ohm-centimeter, depending upon the core geometry used.

Furthermore, many magnetizable ferrites also exhibit satisfactorily large unsaturated permeabilities and adequately large saturation flux densities, as may be required in ferroresonant saturable reactors and transformers to enable the saturable reactor to exhibit relatively large unsaturated inductances without requiring an unduly large cross-sectional area or excessive number of reactor winding turns for a given output voltage.

When a magnetizable ferrite is used as the core material in a high frequency ferroresonant saturable reactor arrangement, the magnetic operating point of the core material traverses substantially the entire major B-H hysteresis loop characteristic of the core material during each cycle of the alternating polarity output voltage. Energy proportional to the area of the major B-H hysteresis loop is dissipated during each cycle as heat in each unit volume of the core material. The magnetizable core of the saturable reactor therefore heats up to reach a higher than ambient equilibrium operating temperature that is a function of the hysteresis and eddy current losses incurred within the material, the core geometry, surface area to volume ratio and the thermal conductivity of the ferrite material. The thin slab geometry of the core 20 of FIG. 1 and the tall, thin walled geometry of the core of FIG. 4 produce a relatively large surface area to volume ratio to provide relatively good core cooling.

The regulated output voltage of a ferroresonant saturable reactor arrangement is a function of the saturation flux density of the saturating core magnetizable material. The output voltage decreases, for example, with decreasing flux densities. The magnitude of the change in saturation flux density with temperature of many magnetizable ferrites is relatively large, making these ferrites relatively unsuitable for use in a ferroresonant saturable reactor power supply that requires the development of a relatively temperature stable output voltage.

In accordance with the invention, a Bsat temperature stable magnetizable ferrite is selected as the magnetizable material of the saturating core of a ferroresonant saturable reactor arrangement. The magnetizable material comprises a ferrospinel or magnetizable ferrite selected from one of a lithium ferrite and a substituted lithium ferrite. An appropriate substituted lithium ferrite may comprise a lithium-manganese ferrite or a lithium-zinc ferrite. When properly manufactured, such lithium cation containing ferrites have the advantageous properties of both temperature stable saturation flux density and relatively low coercivity, $H_c$. Thus, when used as the saturating core material in a ferroresonant saturable reactor system, a lithium ferrite or a substituted lithium ferrite produces a relatively small change in regulated output voltage with a change in core operating temperature, and at the same time, enables the increase in core operating temperature due to hysteresis and eddy current loss induced temperature rise to be relatively small.

Figure 3:
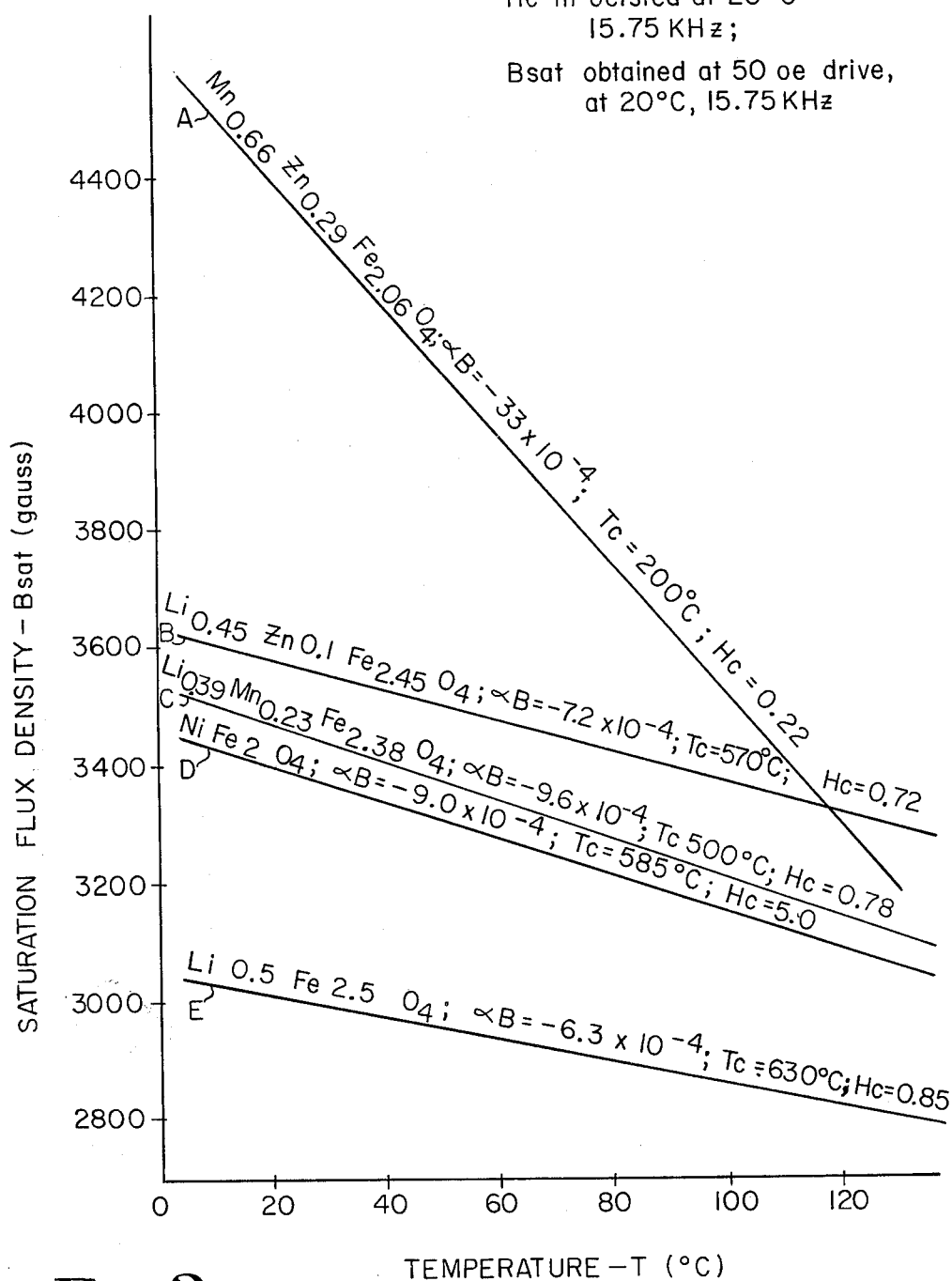
FIG. 3 illustrates curves of saturation flux density versus temperature for various types of magnetizable ferrites.

FIG. 3 illustrates curves of saturation flux density Bsat versus temperature for various magnetizable ferrite compositions as expressed by their mole-fraction formula. The flux density obtained at a magnetizing force drive of 50 oersted was conveniently assigned the nomenclature saturation flux density, Bsat. The slope of each curve is a measure of the Bsat temperature stability of the ferrite composition. The slope of the curve determines the temperature coefficient $\alpha_B$ of the material, where $\alpha_B = (\Delta B_{sat}/B_{sat})(1/\Delta T)$ or $\alpha_B$ equals the fractional change in Bsat per degree centigrade.

In general, the shallower the slope of the curve in FIG. 3, the more temperature stable is the ferrite composition and the more suitable is the composition for use as a magnetizable core material in a high frequency ferroresonant power supply, provided with coercivity $H_c$ of the material is not excessive. In general, in accordance with the invention, lithium ion containing ferrospinels formulated to generate curves similar to curves B, C and E may be used as a saturating core magnetizable material in a suitably designed high frequency ferroresonant power supply. Each of the three lithium compositions B, C and E of FIG. 3 was prepared using a predetermined amount of bismuth oxide additive as a sintering agent to promote the growth of large microscopic grains of ferrite and thus produce a lithium containing ferrite having a relatively small coercivity $H_c$. Formulations of lithium ferrite and substituted lithium ferrite suitable for use in high frequency ferroresonant power supplies, such as television receiver ultor power supplies, and their processes of manufacture, are described in the U.S. patent application of I. Gordon, Ser. No. 250,128, filed Apr. 2, 1981, entitled "IMPROVED LITHIUM FERRITE AND METHOD OF MANUFACTURE", now abandoned, herein incorporated by reference.

Curve E is obtained for a single ferrospinel composition of lithium ferrite fabricated in accordance with the teaching of the aforementioned Gordon patent application. The lithium ferrite of curve E has a relatively small temperature coefficient $\alpha_B$ of $-0.63$ part per thousand due in part to its relatively high Curie temperature $T_c$ of around 630° C. The coercivity $H_c$ is 0.85 oersted and is sufficiently small to prevent excessive core temperature rise during operation of a suitably designed high frequency ferroresonant power supply.

If it becomes desirable to further limit the core temperature rise during ferroresonant power supply operation, lithium containing ferrite compositions of a mixed or substituted ferrospinel structure represented by the curves B and C of FIG. 3 may be used. Curve B represents a mixed ferrospinel with a zinc cation used as the substitution, whereas curve C represents a mixed ferrospinel with a manganese cation used as the substitution. By using a suitably formulated and processed lithium-zinc ferrite or lithium-manganese ferrite, the coercivity $H_c$ may be reduced to an $H_c$ of 0.72 oersted for lithium-zinc ferrite of curve B, and to an $H_c$ of 0.78 oersted for lithium-manganese ferrite of curve C. Introducing zinc and manganese as substitutions in a mixed ferrospinel containing lithium as one of the cations reduces the coercivity $H_c$ of the material compared to the coercivity of many formulations of the single ferrospinel, lithium ferrite. The decreased coercivity is obtained at the expense of a decrease in the Curie temperature $T_c$ of the mixed ferrospinel composition, with lithium-zinc ferrite having a Curie temperature of 570° C. and lithium-manganese ferrite having a Curie temperature of 500° C. Because of the reduced Curie temperatures of the lithium-zinc and lithium-manganese ferrospinels, the temperature coefficient $\alpha_B$ is somewhat increased to a value of $-0.72$ part per thousand per degree centigrade for lithium-zinc ferrite and $-0.96$ part per thousand per degree centigrade for lithium-manganese ferrite. The temperature coefficient of these mixed ferrospinels, although increased over the temperature coefficient of the single ferrospinel lithium ferrite, is still satisfactory for use in a suitably designed high frequency ferroresonant power supply.

Lithium ferrospinel and the suitable mixed ferrospinels containing lithium cations as described above and other suitable lithium containing ferrospinels described in the aforementioned Gordon U.S. patent application are well suited as magnetizable ferrite material for the saturating cores in high frequency ferroresonant power supplies in that the lithium containing ferrospinels exhibit the properties of relatively small temperature coefficient $\alpha_B$ of saturation flux density and relatively small coercivity $H_c$. These two properties are desirable in a magnetizable ferrite material for use in a ferroresonant saturable reactor arrangement in that a small temperature coefficient $\alpha_B$ indicates that only a small change in output voltage occurs for a relatively large change in ambient temperature and also indicates that only a relatively small drop in regulated output voltage occurs as the magnetizable core heats up to its equilibrium operating temperature. A relatively small coercivity $H_c$ indicates that the actual operating temperature reached by the core material is not excessively above the ambient temperature.

Other magnetizable ferrites used in high frequency power transformers may not be suitable for use in high frequency ferroresonant power supplies where it is desired that the output voltage be stable with temperature changes and where it is desired that an excessive core temperature rise be avoided. Curve A, for example, represents the curve of saturation flux density versus temperature of a manganese-zinc ferrite used as a core material for a conventional television receiver flyback transformer. Such a manganese-zinc ferrite may, for example, be an RCA 540 ferrite manufactured by RCA Corporation, Indianapolis, Indiana and used in an RCA CTC-85 series color television receiver. Because manganese-zinc ferrites generally have low Curie temperatures, with the manganese-zinc ferrite of curve A having a Curie temperature $T_c$ of 200° C., the temperature coefficient $\alpha_B$ is extremely large and equals approximately $-3.3$ part per thousand per degree centigrade.

Over a typical operating temperature range of 80° C. from, illustratively, 20° C. to 100° C., the saturation flux density of the manganese-zinc ferrite of curve A decreases approximately 25% from a value of 4400 gauss to a value of 3300 gauss. Such a large percentage change in saturation flux density produces a correspondingly large and undesirable percentage change in regulated output voltage of a high frequency ferroresonant transformer. Thus, although the coercivity $H_c$ of manganese-zinc ferrite of curve A is substantially less than the coercivities of the lithium containing ferrites of curves B, C and E, resulting in a significantly smaller core temperature rise in the manganese-zinc saturating core, the excessively large temperature coefficient of saturation flux density of manganese-zinc ferrite makes the material unsuitable for use in a high frequency ferroresonant power supply unless elaborate cooling measures are undertaken to substantially limit the temperature rise of the core. Even then, a change in ambient temperature will produce a substantial flux density change regardless of the thermal design incorporated.

Ferrospinels such as the nickel ferrospinel of curve D may also be unsuitable as a saturating core material even though nickel ferrite exhibits a relatively large Curie temperature $T_c$ of 580° C. and a relatively small temperature coefficient $\alpha_B$ of $-0.9$ part per thousand per degree centigrade. The coercivity $H_c$ of nickel ferrite, however, is around 5.0 oersted or about 7 times the coercivity of the lithium ferrite and substituted lithium ferrites of curves B, C and E. The relatively high coercivity of nickel ferrite produces an excessive temperature core rise above ambient when this ferrite is used as a saturating core material in a high frequency ferroresonant power supply. Thus, although the relatively small temperature coefficient of nickel ferrite results in a relatively small temperature induced drop in regulated output voltage, the excessive saturating core temperature rise above ambient makes the core material relatively unsuitable for use unless special cooling structures are used or upgraded conductor wire insulation and bobbin material are used. The relatively high coercivity of nickel ferrite, indicative of relatively large hysteresis losses incurred by the saturating core during each cycle of the alternating polarity output voltage, also results in relatively inefficient power supply operation.

Figure 2:
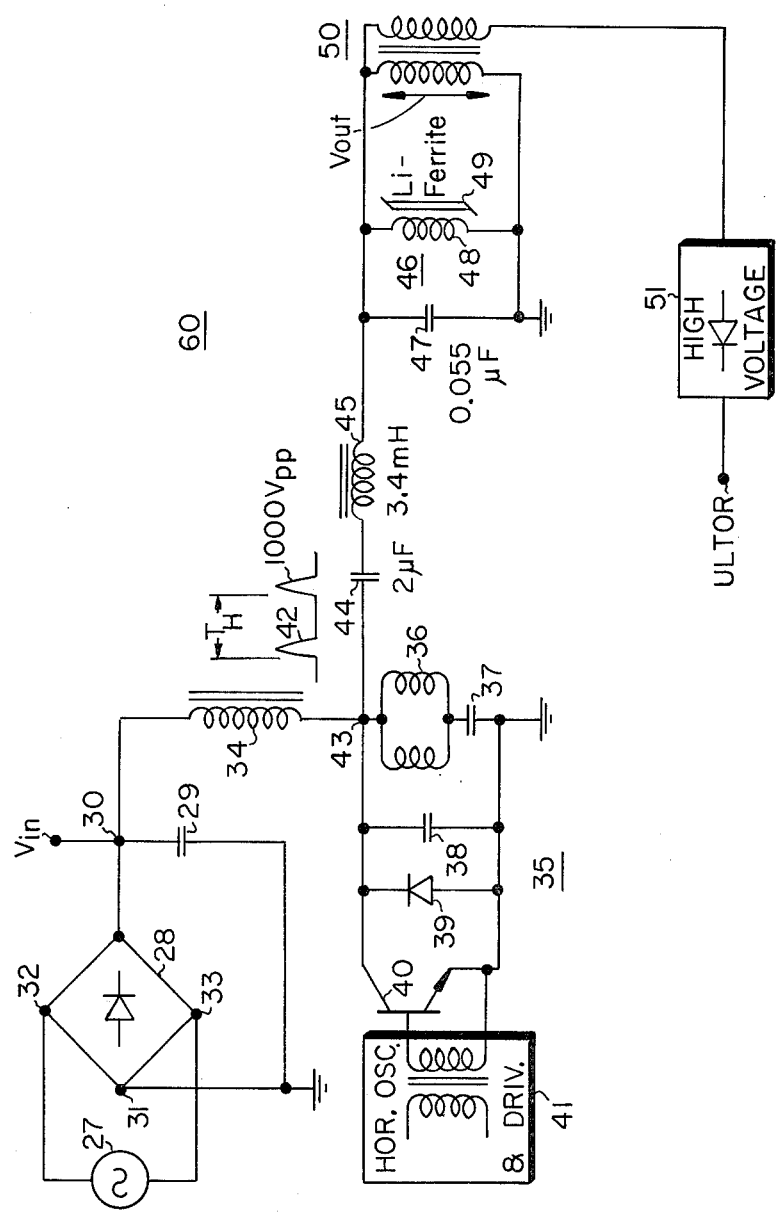
FIG. 2 illustrates a high frequency ferroresonant saturable reactor ultor power supply using the same or similar saturating core materials that are used in FIG. 1.

FIG. 2 illustrates a high frequency ferroresonant power supply using a temperature stable lithium ferrite or substituted lithium ferrite embodying the invention that provides a regulated ultor voltage for a television receiver. In FIG. 2, a source 27 of low frequency alternating polarity mains supply voltage is coupled across input terminals 32 and 33 of a full-wave bridge rectifier 28 to produce an unregulated DC voltage Vin at an output terminal 30. A filter capacitor 29 is coupled between output terminal 30 and a current return terminal 31 of bridge rectifier 28. The input voltage Vin is applied to an input choke 34 to energize a horizontal deflection generator 35 into producing scanning current in a horizontal deflection winding 36.

Horizontal deflection generator 35 comprises a horizontal oscillator and driver 41, a horizontal output transistor 40, a damper diode 39, a retrace capacitor 38, and the series arrangement of horizontal deflection winding 36 and an S-shaping or trace capacitor 37. The horizontal retrace pulse voltage 42 repeating at the horizontal deflection frequency, $1/T_H$, developed at the collector of horizontal output transistor 40 at a terminal 43, is coupled through a DC blocking capacitor 44 and an input inductor 45 to excite a high frequency ferroresonant saturable reactor arrangement 46.

Ferroresonant saturable reactor arrangement 46 comprises a resonating capacitor 47 coupled across a winding 48 that is wound around a saturating magnetizable core 49 comprised of the aforementioned lithium ferrite or substituted lithium ferrite. The unsaturated inductance of reactor winding 48 is illustratively 2 millihenry whereas the saturated inductance is illustratively 100 microhenry. The regulated output voltage Vout developed by ferroresonant saturable reactor arrangement 46 is applied across the primary winding of a step-up high voltage autotransformer 50. The secondary winding of high voltage autotransformer 50 is coupled to a high voltage circuit 51 which may comprise, illustratively, a high voltage multiplier arrangement, to produce a DC ultor voltage at an ultor terminal of a television receiver picture tube, not illustrated.

In the television receiver high frequency ferroresonant ultor voltage power supply 60 of FIG. 2, the retrace pulse voltage 42 developed by deflection generator 35 comprises the alternating input voltage to the ferroresonant saturable reactor arrangement 46.

In a preferred embodiment of the invention, the source of unregulated high frequency alternating input voltage comprises a high frequency inverter producing a high frequency square-wave voltage from an unregulated DC input voltage. The ferroresonant saturable reactor arrangement comprises a ferroresonant transformer with the inverter derived square-wave input voltage being applied to the primary winding of the ferroresonant transformer and the resonant capacitor being coupled across a secondary winding of the ferroresonant transformer that is loosely coupled magnetically to the primary winding. The regulated alternating polarity voltage developed across the secondary winding is then used to derive a regulated B+ scan supply voltage for a horizontal deflection generator. A high voltage winding is tightly coupled magnetically to the secondary winding of the ferroresonant transformer, and a regulated ultor voltage is derived from the regulated alternating polarity voltage developed across the high voltage winding. Such a high frequency ferroresonant television receiver power supply is described in the U.S. patent application of F. S. Wendt, Ser. No. 144,150, filed Apr. 28, 1980, entitled "HIGH FREQUENCY FERRORESONANT POWER SUPPLY FOR A DEFLECTION AND HIGH VOLTAGE CIRCUIT", now U.S. Pat. No. 4,319,167, or in the U.S. patent application of F. S. Wendt, Ser. No. 007,814, filed Jan. 30, 1979, entitled "HIGH FREQUENCY FERRORESONANT TRANSFORMER", now U.S. Pat. No. 4,262,245, herein incorporated by reference.

In accordance with the present inventive teachings, previously described regarding the use of lithium ferrite or substituted lithium ferrite in a high frequency ferroresonant power supply, the magnetizable core of the television receiver ferroresonant transformers described in the two aforementioned Wendt U.S. patent applications may advantageously use lithium ferrite or substituted lithium ferrite as the transformer saturating core material.

Furthermore, in accordance with the teachings of the U.S. patent application of W. E. Babcock et al., Ser. No. 250,130, filed Apr. 2, 1981, entitled "TELEVISION RECEIVER FERRORESONANT POWER SUPPLY USING A TWO-MATERIAL MAGNETIZABLE CORE ARRANGEMENT", now U.S. Pat. No. 4,390,819, only the saturating secondary core portion of the ferroresonant transformer magnetizable core need be formed of lithium ferrite or substituted lithium ferrite to achieve the beneficial results, presently taught, of using a lithium containing ferrospinel as a saturating core material. The primary core section of the ferroresonant transformer described in the aforementioned Babcock et al. U.S. patent application may be selected, as is taught in the Babcock et al. U.S. patent application, to exhibit magnetic properties which are beneficial when the magnetizable core is operated in the substantially linear region of its B-H curve characteristic as is the primary core section of the ferroresonant transformer described in the aforementioned Babcock et al. U.S. patent application.

Tables I and II, given below, illustrate the effects of using various saturating secondary core section materials in a two-material ferrite core during operation of a television receiver ferroresonant transformer providing a regulated B+ scan voltage and a regulated ultor high voltage, as described in the aforementioned U.S. patent application of W. E. Babcock et al. The primary core material for each of the examples of a secondary core section material is a manganese-zinc ferrite. The ferroresonant transformer was used as the power supply for a modified CTC-99 color television receiver manufactured by RCA Corporation, Indianapolis, Indiana. The picture tube was a 19 inch, 100 degree, wide-angle tube. Total television receiver power consumption was 98 watts at one milliampere beam current draw.

Example numbers 1 and 2 of the tables illustrate the advantageous use of either a lithium ferrite, Example #1 of the tables, or of a substituted lithium ferrite, a lithium-manganese-zinc ferrite, Example #2, in accordance with the present inventive teaching regarding the use of lithium ferrite or substitute lithium ferrite in a high frequency ferroresonant power supply. In contrast, results are also given when using a manganese-zinc ferrite, Example #3, or a nickel ferrite, Example #4, as the saturating secondary core section material.

The values in Table I in the column identified as "$\Delta T$" are values of the temperature increase above an ambient temperature of 25° C. that occurs in the ferroresonant transformer saturating secondary core section after the television receiver is turned on and the core temperature has reached its equilibrium value. The values in the column identified as "$\Delta U$" are values of the decrease in ultor voltage below the nominal voltage of 32 kilovolts developed by the ferroresonant transformer when the television receiver is first turned on. The nominal voltage of 32 KV was obtained when using each of the materials in Examples #1 through Example #4, even though the materials differ in saturation flux density Bsat, by maintaining constant the total saturating flux by adjusting the cross-sectional area of the saturating core. The value of the flux density obtained at a magnetizing force of 25 oersted was conveniently designed as Bsat. The values of $H_c$ and Bsat given in Table II are the values obtained at 15.75 KHz and at a temperature of 25° C.

From the tables, one notes that the magnitude of the temperature coefficient $\alpha_B$ of lithium ferrite and lithium-manganese-zinc ferrite is under 1 to 1.5 part per thousand per degree centigrade and the coercivity is less than 1.0 oersted at 25° C., producing a drop in high voltage of less than 2.4 kilovolt from the nominal value of 32 kilovolt.

For the manganese-zinc ferrite, Example #3 in the tables, a relatively small core temperature rise $\Delta T$ is produced, due in part to the relatively low coercivity $H_c$ of manganese-zinc ferrite. Nevertheless, manganese-zinc ferrite may be an unsatisfactory saturating core material to use because of the excessive ultor voltage drop of 3.5 KV, due in part to the relatively high temperature coefficient $\alpha_B$ exhibited by the material. The manganese-zinc ferrite produces a relatively large fractional change in ultor voltage of 110 parts per thousand and thus may be unacceptable as a saturating secondary core section material.

The nickel ferrite, Example #4 in the tables, exhibits a relatively good temperature coefficient of saturation flux density of $-9.0 \times 10^{-4}/°C$. Nevertheless, the nickel ferrite may be an unsatisfactory saturating core material to use because of its relatively large coercivity of 5.0 oersted. The large coercivity results in an excessive temperature rise $\Delta T$ and in an excessive drop in ultor voltage of 3.4 kilovolt.

A reasonably acceptable fractional change of ultor voltage, $\Delta U/U$, may be, for example, a change equal to or less than 75 parts per thousand between end points of the normal operating temperature range of the power supply. An acceptable value of the magnitude of $\alpha_B$ exhibited by the material over the normal core operating temperature range may be equal to or less than 1.5 part per thousand per degree centigrade. An acceptable value of the coercivity may be equal to or less than 1.5 oersted. Acceptable values of $\alpha_B$, $H_c$ and $\Delta U/U$ depend on such parameters as the degree of output voltage regulation desired, the range of temperatures including ambient temperature variations within which the power supply is expected to operate satisfactorily, the picture tube screen size and power consumption, the maximum component temperature allowable and the amount of overscan permitted during the television receiver operation.

Thus, in accordance with the invention, the use of lithium ferrite and substituted lithium ferrite that possess the properties of small temperature coefficient of saturation flux density and small coercivity is extremely beneficial in designing a ferroresonant power supply that provides an output voltage that is relatively insensitive to temperature changes and that produces a rather limited saturating core temperature rise above ambient temperature.

Other desirable properties that the lithium ferrite may possess are a relatively high resistivity and a relatively square B-H hysteresis loop characteristic. A squareness ratio may be defined as Br/Bmax where Br is the retentivity of the material and Bmax is the flux density obtained at a magnetizing force of 50 oersted. A squareness ratio equal to or greater than 0.6 may be desirable to provide improved output voltage regulation.

TABLE I

| Ex. # | Sec. Core Sat. Matl. | $-\Delta U$ (KV) | $-(\Delta U/U)$ ($\times 100$) | $\Delta T$ (°C.) |
|---|---|---|---|---|
| 1 | LiFerrite | 1.5 | 4.6 | 92 |
| 2 | LiMnZnFerrite | 2.3 | 7.2 | 89 |
| 3 | MnZnFerrite | 3.5 | 11.0 | 51 |
| 4 | NiFerrite | >3.4 | >10.5 | >165 |

TABLE II

| Ex. # | Sec. Core Sat. Matl. | $T_c$ (°C.) | $-\alpha_B (\times 10^4/°C.)$ | Bsat (Gauss) | $H_c$ (Oer.) |
|---|---|---|---|---|---|
| 1 | LiFerrite | 630 | 5.4 | 2900 | 0.94 |
| 2 | LiMnZnFerrite | 500 | 10.7 | 3400 | 0.70 |
| 3 | MnZnFerrite | 200 | 32.0 | 4300 | 0.24 |
| 4 | NiFerrite | 585 | 9.0 | 3200 | 5.0 |

What is claimed is:

1. A saturating core power supply to provide a regulated television display ultor voltage that is relatively insensitive to changes in core temperature, comprising:
   a source of alternating input voltage;
   a saturating magnetic element including a magnetizable core and a winding located on said core;
   means coupled to said source and to said winding for developing a magnetizing current that generates in said magnetizable core an alternating magnetic flux that links said winding so as to develop an alternating polarity output voltage;
   a capacitance for developing a circulating current that generates a magnetic flux in a core section associated with said winding that aids in magnetically saturating said associated core section to regulate said alternating polarity output voltage;
   an ultor terminal;
   high voltage means coupled to said ultor terminal and responsive to said regulated alternating polarity output voltage for developing a regulated ultor voltage at said ultor terminal, wherein to provide temperature stability of said regulated ultor voltage, said magnetically saturating associated core portion of said saturating magnetic element is formed of a magnetizable material comprising a magnetizable ferrite selected from one of a lithium ferrite and a substituted lithium ferrite such that the magnitude of the fractional change of saturation flux density per degree centigrade exhibited by said one ferrite over the normal operating temperature range of said power supply is equal to or less than 1.5 part per thousand per degree centigrade and such that the coercivity of said one ferrite is equal to or less than 1.5 oersted.

2. A power supply according to claim 1 wherein the magnitude of the fractional change of ultor voltage between end points of the normal operating temperature range of said power supply is equal to or less than 75 parts per thousand.

3. A power supply according to claim 1 wherein said source of alternating input voltage comprises a horizontal deflection generator that produces a horizontal retrace pulse voltage and wherein said magnetizing current developing means includes an input inductance to which said retrace pulse voltage is applied.

4. A saturating core power supply having an output voltage that is relatively temperature stable, comprising:

a source of alternating input voltage;

a saturating magnetic element including a magnetizable core and a winding located on said core;

means coupled to said source and to said winding for developing a magnetizing current that generates in said magnetizable core an alternating magnetic flux that links said winding so as to develop an alternating polarity output voltage;

a capacitance for developing a circulating current that generates a magnetic flux in a core section associated with said winding that aids in magnetically saturating said associated core section to regulate said alternating polarity output voltage; and a load circuit coupled to and energized by said regulated alternating polarity output voltage, wherein to provide temperature stability of said regulated output voltage, said magnetically saturating associated core section of said saturating magnetic element is formed of a magnetizable material comprising a ferrospinel selected from one of a lithium ferrite and a substituted lithium ferrite such that the magnitude of the fractional change of saturation flux density per degree centigrade exhibited by said magnetizable material over the normal operating temperature range of said power supply is equal to or less than 1.5 part per thousand per degree centigrade and such that the coercivity of said magnetizable material is equal to or less than 1.5 oersted.

5. A power supply according to claims 1, 2, 3 or 4 wherein said substituted lithium ferrite comprises lithium-zinc ferrite.

6. A power supply according to claims 1, 2, 3 or 4 wherein said substituted lithium ferrite comprises lithium-manganese ferrite.

7. A power supply according to claims 1, 2, 3 or 4 wherein said substituted lithium ferrite comprises lithium-manganese-zinc ferrite.

8. A saturating core power supply to provide a regulated television display ultor voltage that is relatively insensitive to change in core temperature, comprising:

a source of alternating input voltage;

a saturating magnetic element including a magnetizable core and a winding located on said core;

means coupled to said source and to said winding for developing a magnetizing current that generates in said magnetizable core an alternating magnetic flux that links said winding so as to develop an alternating polarity output voltage;

a capacitance for developing a circulating current that generates a magnetic flux in a core section associated with said winding that aids in magnetically saturating said associated core section to regulate said alternating polarity output voltage;

an ultor terminal;

high voltage means coupled to said ultor terminal and responsive to said regulated alternating polarity output voltage for developing a regulated ultor voltage at said ultor terminal, wherein to provide temperature stability of said regulated ultor voltage, said magnetically saturating associated core section of said saturating magnetic element is formed of a magnetizable material selected such that the magnitude of the fractional change in saturation flux density per degree centigrade of said material over the normal operating temperature range of said power supply is equal to or less than 1.5 part per thousand per degree centigrade and wherein said magnetizable material is further selected to exhibit a coercivity equal to or less than 1.5 oersted at 25 degrees centigrade.

9. A power supply according to claim 8 wherein the magnitude of the fractional change of ultor voltage between end points of the normal operating temperature range of said power supply is equal to or less than 75 parts per thousand.

10. A power supply according to claim 9 wherein the frequency of said alternating input voltage equals or is greater than the horizontal deflection frequency.

11. A power supply according to claim 10 wherein said magnetizable material comprises lithium ferrite or substituted lithium ferrite.

* * * * *